June 29, 1943.　　　T. E. PILSON　　　2,323,153
MOTOR MOUNT
Filed March 23, 1942
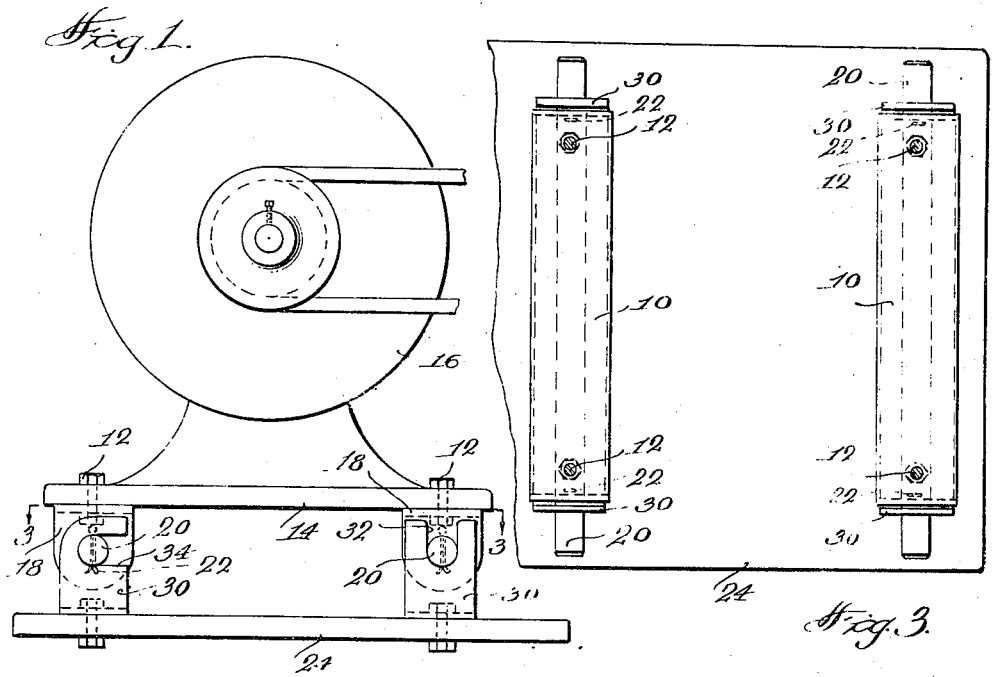
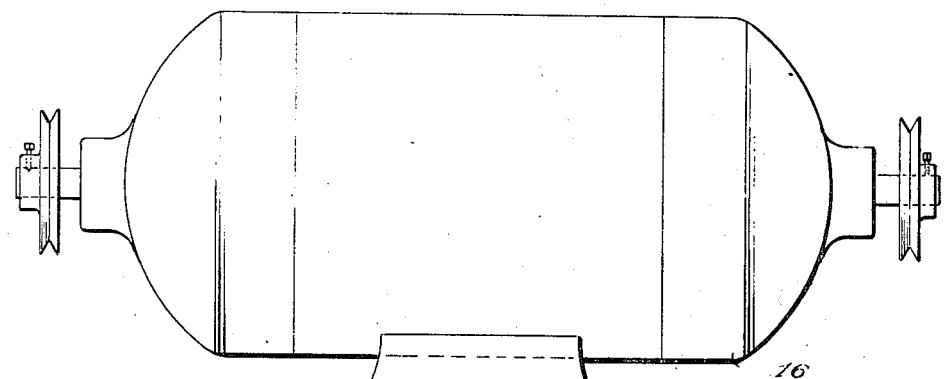
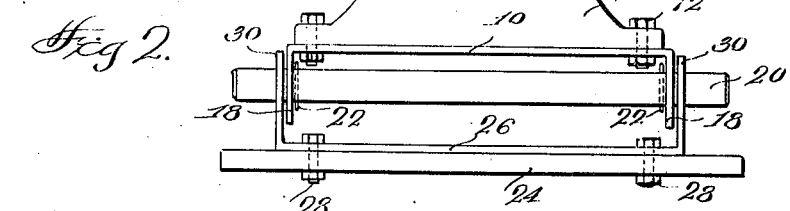
INVENTOR.
Turner E. Pilson
BY
Victor J. Evans & Co.
ATTORNEYS Patented June 29, 1943

2,323,153

UNITED STATES PATENT OFFICE 2,323,153

MOTOR MOUNT

Turner E. Pilson, Roanoke, Va.

Application March 23, 1942, Serial No. 435,894

3 Claims. (Cl. 248—19)

My invention relates to motors and the like and has among its objects and advantages the provision of an improved motor mount.

In the accompanying drawing:

Figure 1 is an end view of the motor and the mount therefor;

Figure 2 is a side elevational view;

Figure 3 is a view taken from the position indicated by line 3—3 of Figure 1; and Figure 4 is a perspective view of a structural member comprising a portion of the mount.

In the embodiment selected for illustration, two bars 10 are bolted at 12 to the base 14 of the electric motor 16. Both bars are bent to provide right angular ears 18 bored to receive a shaft 20 restrained from relative axial movement by reason of cotter pins 22.

To the support 24, which may comprise a work bench, machine or the like, is secured two bars 26, each fixedly secured to the support by bolts 28 and bent to provide ears 30. The ears 30 on one of the bars 26 are provided with slots 32 extending inwardly from the ends thereof. The slots are of greater depth than the diameter of the shaft and the latter fits loosely therein so as to be readily removable.

The ears 30 of the second bar 26 are provided with slots 34 extending inwardly from one edge of the ears so as to lie at right angles to the slots 32. The second shaft 20 is also freely receivable in the slots 34 and this shaft bears against the end walls of the slots as the other shaft 20 is dropped into the slots 32.

In operation, the bars 10 are permanently connected with the motor base 14 and sets of bars 26 are permanently connected with the various machines in the shop. Thus the motor 16 may be shifted from machine to machine by merely disconnecting the belt and lifting one of the shafts out of the slots 32 and exerting a lateral movement to the motor assembly for withdrawing the other shaft 20 from the slots 34. This mount provides a sturdy support for the motor and its construction is such as to effectively support the motor in various angular positions, depending upon the arrangement of the bars 26 on the respective machines and work benches.

Without further elaboration, the foregoing will so fully illustrate my invention, that others may, by applying current knowledge, readily adapt the same for use under various conditions of service.

I claim:

1. The combination of a motor, a support, slotted members fixedly connected with said support, the slots in one of said members being arranged at right angles to the slots in the other member, pin-like means fixedly connected with the motor and detachably receivable in the slots in said members for detachably connecting the motor therewith.

2. The combination of a motor having two members fixedly secured thereto and each member provided with two ears, shafts connected with said ears, a support, and two members fixedly secured to said support, each member having two ears arranged for overlapping relationship with both ears on one of said first-mentioned members, the ears on the members secured to said support being slotted for the reception of said shafts.

3. The invention described in claim 2 wherein the slots in the ears of one member secured to the base are arranged at right angles to the slots in the ears of the other member secured to the base.

TURNER E. PILSON.